US 8,300,981 B1

(12) United States Patent
Praly et al.

(10) Patent No.: US 8,300,981 B1
(45) Date of Patent: *Oct. 30, 2012

(54) SYSTEM AND METHOD FOR ANALYZING MULTIPLE THERMAL IMAGES

(75) Inventors: Sebastien Praly, Ben Lomond, CA (US); Stefan H. Warnke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 1365 days.

This patent is subject to a terminal disclaimer.

(21) Appl. No.: 11/711,887

(22) Filed: Feb. 28, 2007

(51) Int. Cl.
*G06K 9/36* (2006.01)
(52) U.S. Cl. .................................................. 382/284
(58) Field of Classification Search ................ 250/330; 382/100, 105, 103, 284; 348/164, 369; 702/183, 702/185, 187
See application file for complete search history.

(56) References Cited

U.S. PATENT DOCUMENTS

| | | | | |
|---|---|---|---|---|
| 5,014,129 A * | 5/1991 | Imanishi | ...................... | 348/581 |
| 5,160,842 A * | 11/1992 | Johnson | ...................... | 250/338.1 |
| 5,386,117 A * | 1/1995 | Piety et al. | ...................... | 250/330 |
| 5,637,871 A * | 6/1997 | Piety et al. | ...................... | 250/330 |
| 5,677,532 A * | 10/1997 | Duncan et al. | ........... | 250/339.15 |
| 5,812,112 A * | 9/1998 | Helfferich | .................. | 345/440.1 |
| 5,856,931 A * | 1/1999 | McCasland | .................... | 702/182 |
| 6,594,621 B1 * | 7/2003 | Meeker | ......................... | 702/185 |
| 6,606,115 B1 * | 8/2003 | Alicandro et al. | ............ | 348/164 |
| 6,849,849 B1 * | 2/2005 | Warner et al. | ................. | 250/330 |
| 7,454,050 B2 * | 11/2008 | Garvey | ......................... | 382/141 |
| 7,459,107 B2 | 12/2008 | Yamashita et al. | | |
| 7,561,200 B2 * | 7/2009 | Garvey et al. | ............ | 348/333.01 |
| 7,847,251 B1 * | 12/2010 | Praly | ............................ | 250/330 |
| 2005/0104771 A1 * | 5/2005 | Terry et al. | ..................... | 342/195 |
| 2006/0017821 A1 * | 1/2006 | Garvey et al. | .............. | 348/231.3 |
| 2007/0034798 A1 | 2/2007 | Hamrelius et al. | | |
| 2007/0087311 A1 * | 4/2007 | Garvey et al. | ................... | 434/21 |
| 2008/0211915 A1 * | 9/2008 | McCubbrey | .................. | 348/159 |
| 2008/0308732 A1 * | 12/2008 | Warnke et al. | ................ | 250/330 |
| 2009/0009596 A1 * | 1/2009 | Kerr et al. | ...................... | 348/117 |

OTHER PUBLICATIONS

Fluke Corporation, "InsideIR Thermal Image Analysis Software," User's Manual, 38 pages, Jan. 2006.
Fluke Corporation, "Ti20 Thermal Imager," Users Manual, 68 pages, Jan. 2006.

* cited by examiner

*Primary Examiner* — Jingge Wu
(74) *Attorney, Agent, or Firm* — Perkins Coie LLP

(57) ABSTRACT

A graphical user interface for analyzing multiple thermal images is provided. The interface can be used to identify the temperatures at multiple points defined on multiple images. In some embodiments, the interface can simultaneously display temperature cursors overlaid on multiple images and provide simultaneous numerical identification of the temperatures corresponding to the area under the temperature cursors.

20 Claims, 4 Drawing Sheets

SYSTEM AND METHOD FOR ANALYZING MULTIPLE THERMAL IMAGES

TECHNICAL FIELD

The following is related to thermal imaging systems and procedures, and more particularly, to systems and methods for viewing multiple thermal images and analyzing associated data recorded by thermal image devices.

BACKGROUND

Thermal imaging instruments are necessary because the human eye cannot perceive temperature directly. Thermographic imaging systems operate by mapping detected temperatures to the spectrum of visible light. A relatively cold temperature may be displayed as a black or blue color while a relatively hot temperature may be displayed as a red or white color.

Infrared thermal imaging instruments commonly are used for obtaining temperature profiles of objects such as industrial machines or components of operating equipment. Inspecting an object's operating temperature conditions can reveal whether a failure is imminent or a machinery adjustment is necessary. Portable imagers are particularly useful for inspecting a series of machines along a route in, for example, a factory.

Some known systems include capability for downloading thermal images recorded on the device to a base computer. The base computer can be used to store downloaded images or to view images on a computer screen that is much larger than the user interface provided in a portable thermal imaging device. As examples, available imaging software applications enable users to create collections of images and organize sequences of images for comparison. Images that are organized into a collection then can be displayed as a "gallery" of images, such that a user can simultaneously inspect a plurality of images at a glance. If the user desires additional information about any given image, known imaging software applications enable the user to select a single image and view only the selected image.

DETAILED DESCRIPTION

A computer software system and graphical user interface are described herein that provide improved capabilities for viewing thermal images and analyzing associated data recorded by thermal image devices. This enables users to interpret thermal profiles for a plurality of images more quickly and effectively.

A thermal imaging instrument can be used in conjunction with imager software installed in a computer system, such as a PC or laptop computer, to organize and track maintenance data. Once a user has captured a series of images on a portable device, the images can be downloaded or otherwise transferred to a host computer. This transfer can be performed via a USB, Firewire, serial, parallel, or other wired or wireless conduit. Images can then be stored on the computer as a collection of images.

Images (and their associated data) in the collection then can be moved into different folders to organize information specific to different groups of equipment, plant areas, departments, etc. Once a thermographic image has been transferred to the host computer, additional analysis can be performed. For example, the interface can be configured to display the temperature of any target point on a thermographic image. A target temperature point can be user-selected using any suitable interface device.

Figure 1:
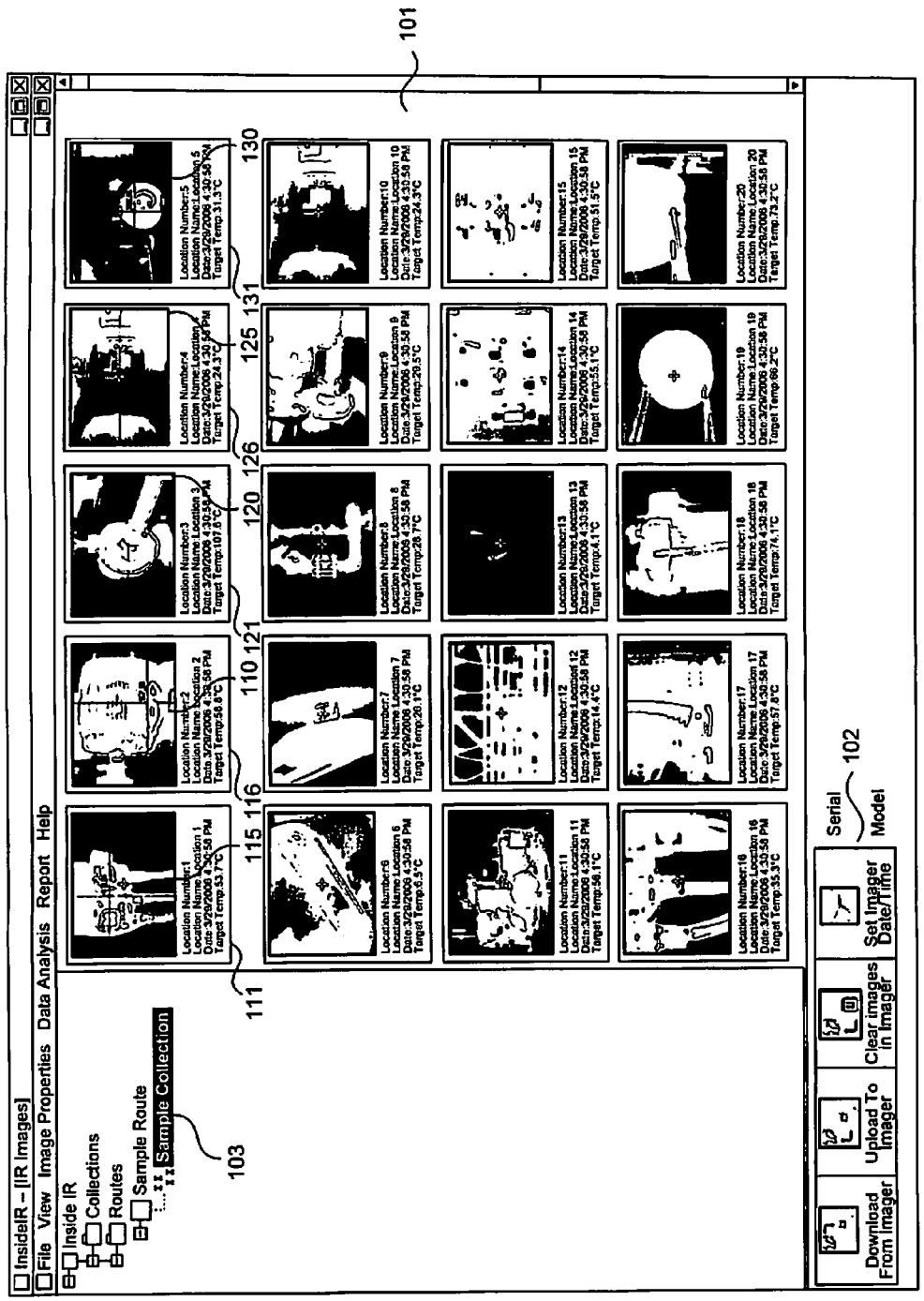
FIG. 1 illustrates an example interface for displaying multiple thumbnails associated with previously captured image data.

FIG. 1 illustrates an exemplary window configuration for managing downloaded images. As shown, the window configuration can include a pane area (101) for displaying thumbnails of the images. A button area (102) can be provided for displaying functional buttons or icons. A folder view area (103) can be provided for displaying a tree view of folders for storing one or more hierarchical collections of images.

Displaying a collection of thermographic images as thumbnails enables a user to view and analyze several smaller images simultaneously, instead of analyzing one full size image at a time. In some embodiments, to navigate within the GUI, such as to select a particular thumbnail to be opened or viewed, a screen cursor or pointer can be used. The cursor or pointer can be displayed as a small arrow which, in combination with a mouse click, allows the user to select a displayed object such as a thumbnail. The screen cursor can be moved to a desired screen location in response to movements of a pointing device (e.g., a mouse, trackball, or similar device) by the user. The pointing device can include one or more switches or buttons for receiving additional user input.

As used herein, a "thumbnail" is a quantity of data which is derived from a larger quantity of data, such as an image file. To obtain a thumbnail, an image file can be opened and optically reduced or scaled to a smaller size; or, alternately, discrete portions of data from the file can be copied from the file. Thumbnail data, as used herein, can include a quantity of data which may be stored in any suitable form, for example ASCII or binary formats.

In some embodiments, a thumbnail is an image whose size has been reduced to decrease the amount of display space required to render the thumbnail image. In general, the thumbnails described herein need only be sufficiently detailed to provide a viewer sufficient visual information concerning the content of the original image, such as to enable the viewer to decide whether to view the corresponding original image or to enable to viewer to recognize the subject of the image. The actual size of thumbnail images can vary depending on a variety of factors, some of which may be defined by a user. In some embodiments, the thumbnail displayed can incorporate the full resolution of the original acquired image.

In some embodiments, the interface can be configured to display data associated with thumbnails. The display data can include, but is not limited to, metadata and other data including location data, temperature data, caption data, and descriptive text.

Temperature Cursor

In some embodiments, a multiple temperature cursors can be positioned on multiple thumbnail images displayed to a user. As illustrated in FIG. 1, temperature cursors 110, 115, 120, 125, and 130 can be placed on multiple images so that a user can inspect multiple temperature points on multiple images simultaneously.

Figure 2:
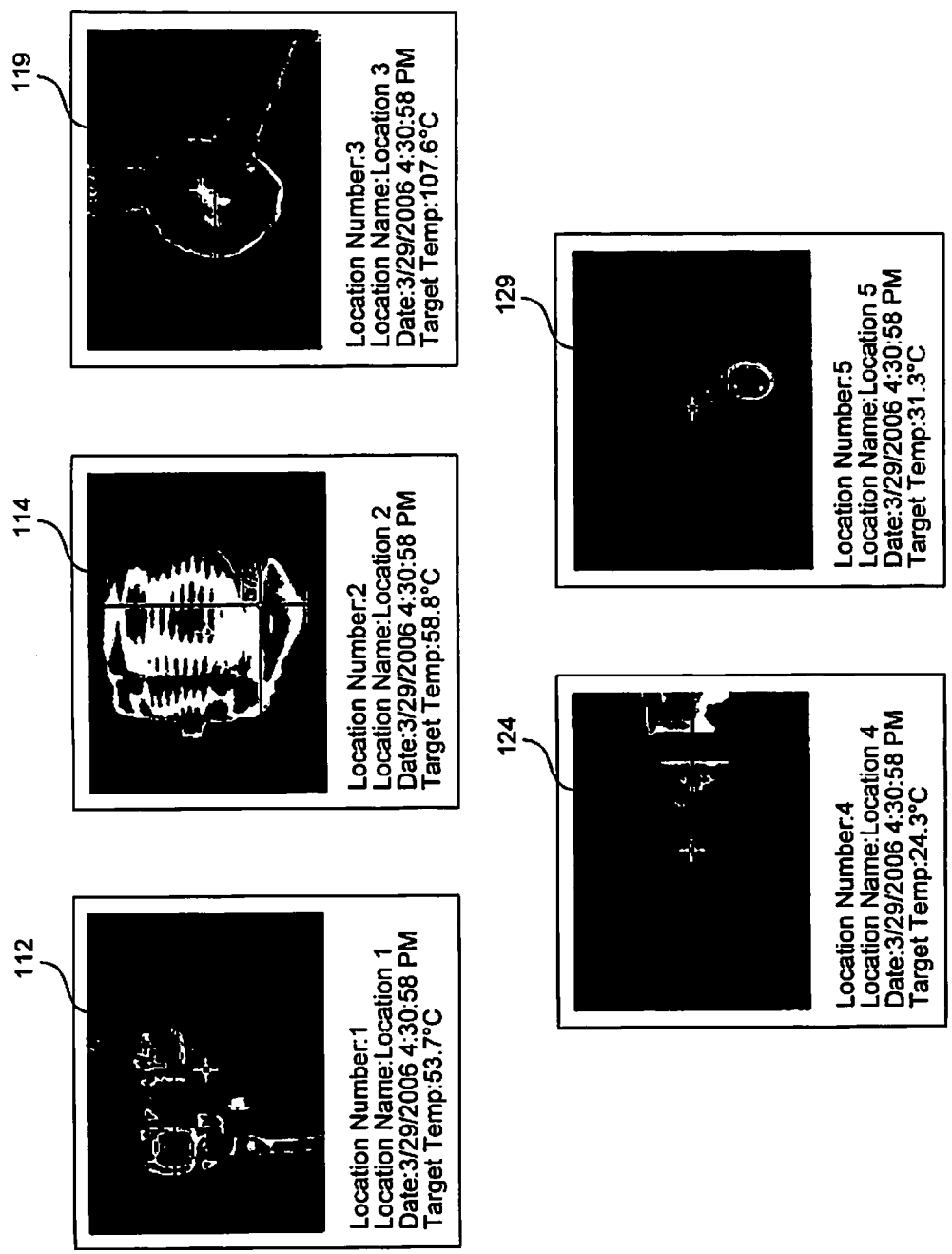
FIG. 2 illustrates an example interface for displaying multiple thumbnails associated with previously captured image data.
Figure 3:
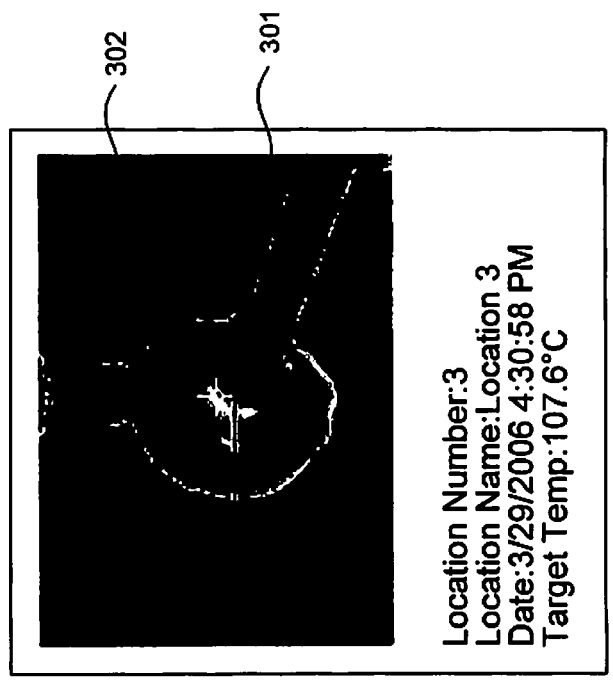
FIG. 3 illustrates a detail view of a single thumbnail associated with previously captured image data.

In some embodiments, the temperature cursor can be a crosshair formed by intersecting vertical and horizontal lines. Such embodiments are illustrated in FIGS. 1-3. In other embodiments, a temperature cursor can be represented on a display by a pointer, an "X," a box shape, or any other visual indicia capable of identifying a region or point of interest on an image.

Using the interface illustrated in FIG. 1, a user can place multiple temperature cursors on multiple images. For example, a user could first place cursor 110 on image 111, then place cursor 115 on image 116, and so on for images 121, 126, and 131 and respective cursors 120, 125, and 130. The cursors can be applied in any order and placed on any image presented to a user. As illustrated in more detail in FIG. 3, a numerical temperature display 302 can be shown proximate to temperature cursor 301. Temperature display 302 can be configured to display the temperature of a point under temperature cursor 301. As illustrated in more detail in FIG. 2, temperature displays 112, 114, 119, 124, and 129 can be displayed proximate to their corresponding temperature cursors.

In some embodiments, a user can define a certain displayed image as a parent image and other images as child images. When the user later repositions a temperature cursor on the parent image, the temperature cursors overlaid on all child images can also be automatically repositioned based on the modification made to cursor overlaid on the parent image.

A temperature cursor can be placed on an image by a user using any input device including those described below. In some embodiments, when a pointing device with a button or similar selector is employed, a user can drag to reposition an existing overlaid cursor on an image and an updated corresponding temperature will be displayed. If the underlying image is defined as a parent image, all of the corresponding children can be continually updated based on the dragging of the overlaid cursor on the parent. Thus, the interface would simultaneously reposition multiple temperature cursors and display the corresponding numerical temperatures in real-time while the parent temperature cursor is being repositioned.

Automatic Analysis

In some embodiments, the interface can be configured to automatically place a temperature cursor over a point in the image that satisfies certain predetermined criteria. For example, the interface could automatically place a cursor over the hottest point of the image, i.e., the portion having the highest temperature.

In some embodiments, the interface can be configured to automatically propagate a cursor location over a plurality of displayed images. For example, a user can position a temperature cursor on a first image and then direct the interface to apply that cursor position to any or all of multiple thumbnails previously identified by the user. For example, if a thumbnail image were 100 pixels wide×100 pixels tall, a cursor on that image may be positioned 25 pixels from the bottom edge and 20 pixels from the left edge. This positioning can be automatically replicated across multiple thumbnail images so that each image is also displayed with an overlaid temperature cursor positioned at 25 pixels from the bottom edge and 20 pixels from the left edge. The interface can be configured so that a user can preselect any displayed image and apply the temperature cursor overlay only to the preselected images.

The images displayed on the host computer can represent a route. Systems and methods for routing are further described in U.S. patent application Ser. No. 11/463,234 entitled "SYSTEM AND METHOD FOR CONFIGURING A THERMAL IMAGING INSTRUMENT," the contents of which are herein incorporated by reference in their entirety. For example, ten images could be simultaneously displayed, each of the images representing a thermal image of a transformer found along a route and taken on different days. Each route location can have an associated temperature cursor position. As a result, when multiple images from the route are displayed, temperature cursor overlays can be automatically displayed in the predetermined positions.

Alarms

In some embodiments, thumbnail images can be associated with predetermined alarm settings. For example, a user could specify a maximum temperature to be associated with certain displayed images. If that temperature is met or exceeded, a temperature cursor could be automatically positioned so as to be overlaid over the portion of the image meeting or exceeding the temperature setting and an alarm or alert can be generated.

Alarms can be triggered in this manner for multiple images. For example, for each of images 111, 116, 121, 126, and 131, alarms can be presented to a user if the temperatures associated with corresponding cursors 110, 115, 120, 125, and 130 meet or exceed the predetermined values. The interface can be configured to base the alarms for multiple images on a single predefined temperature value or on multiple predefined temperature values. For example, image 111 can be associated with a unique alarm value. Alternatively, this alarm value can also be propagated to other displayed images.

Suitable Systems

Figure 4:
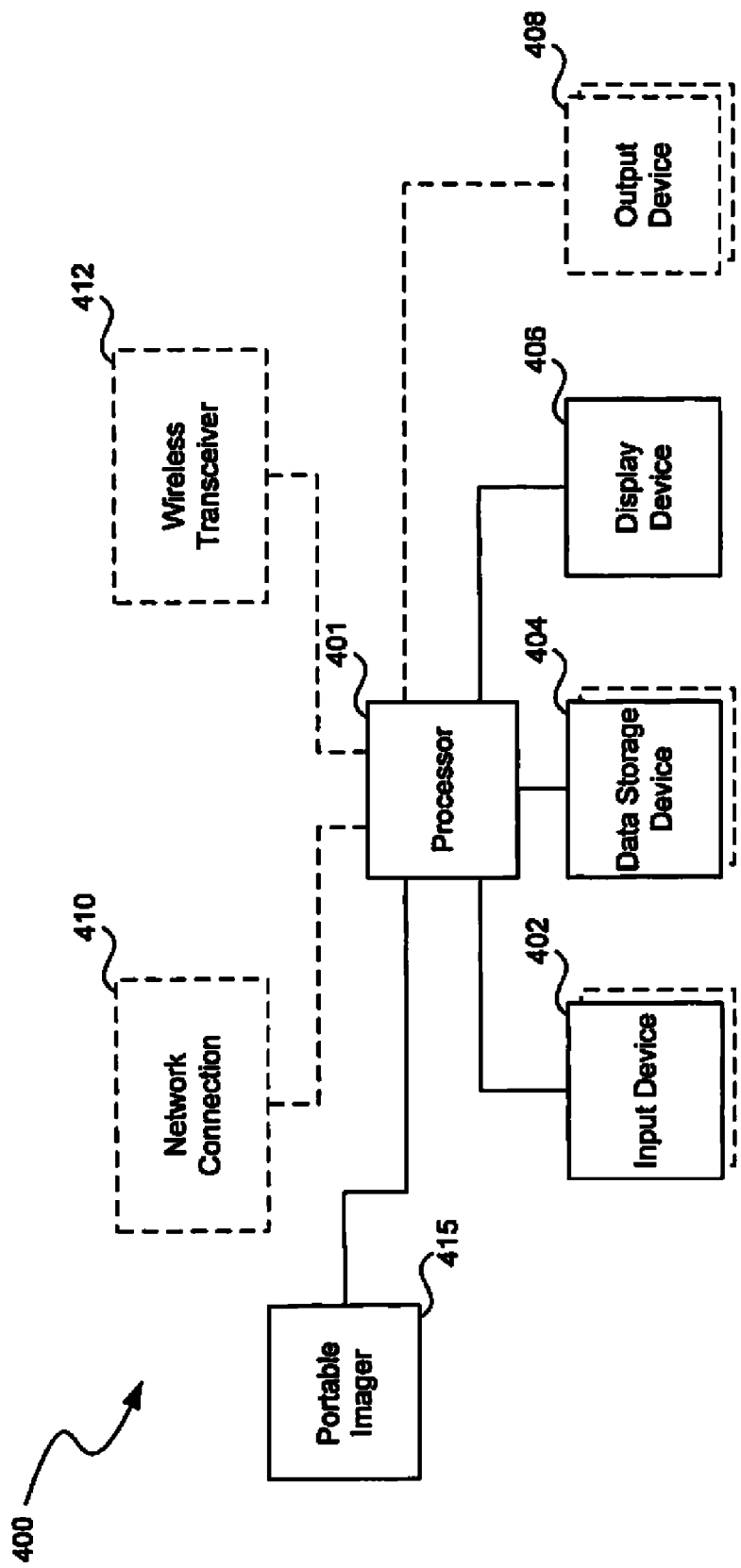
FIG. 4 illustrates an example system for implementing a graphical user interface.

FIG. 4 and the following discussion provide a brief, general description of a suitable computing environment in which various embodiments of the disclosed interface can be implemented. Although not required, aspects and embodiments will be described in the general context of computer-executable instructions, such as routines executed by a general-purpose computer, e.g., a server or personal computer. Those skilled in the relevant art will appreciate that the embodiments can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The embodiments can be embodied in a special purpose computer or data processor that is specifically programmed, configured or constructed to perform one or more of the computer-executable instructions explained in detail below. The term "computer", as used generally herein, refers to any of the above devices, as well as any data processor.

The embodiments can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the interface described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the interface may reside on a server computer, while corresponding portions reside on a client computer. Data structures and transmission of data particular to aspects of the interface are also encompassed within the scope of the disclosure.

Referring to FIG. 4, one embodiment of the interface employs a base computer (400), such as a personal computer or workstation, having one or more processors (401) coupled to one or more user input devices (402) and data storage devices (404). The computer is also coupled to at least one output device such as a display device (406) and one or more optional additional output devices (408) (e.g., printer, plotter, speakers, tactile or olfactory output devices, etc.). The computer may be coupled to external computers, such as via an optional network connection (410), a wireless transceiver (412), or both. The base computer (400) can be in electronic communication with a portable imager (415) so that data can be transferred between the base computer (400) and imager (415). The transfer of data can be performed via a USB, Firewire, serial, parallel, or other wired or wireless conduit.

The input devices (402) may include a keyboard and/or a pointing device such as a mouse. Other input devices are possible such as a microphone, joystick, pen, game pad, scanner, digital camera, video camera, and the like. The data storage devices (404) may include any type of computer-readable media that can store data accessible by the computer (400), such as magnetic hard and floppy disk drives, optical disk drives, magnetic cassettes, tape drives, flash memory cards, digital video disks (DVDs), RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 1).

Aspects of the interface may be practiced in a variety of other computing environments. User computers may include other program modules such as an operating system, one or more application programs (e.g., word processing or spread sheet applications), and the like. The computers may be general-purpose devices that can be programmed to run various types of applications, or they may be single-purpose devices optimized or limited to a particular function or class of functions. Any application program for providing a graphical user interface to a user may be employed.

Many specific details of certain embodiments of the invention are set forth in the description and in FIGS. 1-4 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention.

From the foregoing, it will be appreciated that specific embodiments of the invention have been described herein for purposes of illustration, but that various modifications may be made without deviating from the invention. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention.

We claim:

1. A method for analyzing images received from a thermal imaging device, comprising:
    receiving data at a base computer from the imaging device, wherein the data corresponds to a plurality of thermal images of objects;
    displaying a plurality of images corresponding to the downloaded data on the base computer; and
    displaying a plurality of temperature cursors overlaid on the plurality of displayed images so that at least two images are displayed with overlaid temperature cursors at the same time.

2. The method of claim 1, further comprising simultaneously displaying a plurality of numerical temperature values corresponding to the plurality of overlaid temperature cursors.

3. The method of claim 1, further comprising:
    receiving a user command to associate at least one displayed image with an alarm parameter.

4. The method of claim 3, further comprising:
    providing a perceptible indication that a temperature identified by an overlaid temperature cursor has met or exceeded the associated alarm parameter.

5. The method of claim 1, further comprising:
    receiving a user command indicating a position for a temperature cursor to be overlaid on an image; and
    propagating a plurality of temperature cursors to the indicated position on the plurality of displayed images.

6. The method of claim 1, further comprising:
    receiving a user command to define a displayed image as a parent image; and
    receiving a user command to define a displayed image as a child image.

7. The method of claim 6, further comprising:
    receiving a user input repositioning a displayed temperature cursor overlaid on the parent image; and
    automatically repositioning a displayed temperature cursor overlaid on the child image based on the user input repositioning the temperature cursor on the parent image.

8. A non-transitory machine-readable medium to be executed by a processor for analyzing images received from a thermal imaging device, the non-transitory machine-readable medium comprising:
    an instruction for receiving data at a base computer from the imaging device, wherein the data corresponds to a plurality of thermal images of objects;
    an instruction for displaying a plurality of images corresponding to the downloaded data on the base computer; and
    an instruction for displaying a plurality of temperature cursors overlaid on the plurality of displayed images so that at least two images are displayed with overlaid temperature cursors at the same time.

9. The non-transitory machine-readable medium of claim 8, further comprising instructions for simultaneously displaying a plurality of numerical temperature values corresponding to the plurality of overlaid temperature cursors.

10. A system for analyzing images received from a thermal imaging device, the system comprising:
    a means for receiving data at a base computer from the imaging device, wherein the data corresponds to a plurality of thermal images of objects;
    a means for displaying a plurality of images corresponding to the downloaded data on the base computer; and
    a means for displaying a plurality of temperature cursors overlaid on the plurality of displayed images so that at least two images are displayed with overlaid temperature cursors at the same time.

11. A method for analyzing images received from a thermal imaging device, comprising:
    receiving data at a base computer from the imaging device, wherein the data corresponds to a plurality of thermal images;

displaying a plurality of images corresponding to the data on the base computer;

displaying a plurality of temperature cursors overlaid on the plurality of displayed images such that at least two images are concurrently displayed with overlaid temperature cursors;

receiving a first command to define a displayed image as a parent image;

receiving a second command to define a displayed image as a child image;

receiving a third command to reposition a displayed temperature cursor overlaid on the parent image; and automatically repositioning a displayed temperature cursor overlaid on the child image based on the repositioning of the temperature cursor on the parent image.

12. The method of claim 11, further comprising displaying a plurality of numerical temperature values corresponding to the plurality of overlaid temperature cursors.

13. The method of claim 11, further comprising receiving a command indicating a position for a temperature cursor to be overlaid on an image.

14. The method of claim 13, further comprising propagating a plurality of temperature cursors on the plurality of displayed images based on the indicated position.

15. The method of claim 11, further comprising receiving a user command to associate at least one image with an alarm.

16. A method for analyzing images received from a thermal imaging device, comprising:

receiving data at a base computer from the imaging device, wherein the data corresponds to a plurality of thermal images;

displaying a plurality of images corresponding to the data on the base computer; and displaying temperature information of a plurality of points such that temperature information is shown on least two images that are concurrently displayed.

17. The method of claim 16, further comprising displaying a movable temperature cursor at each of the plurality of points.

18. The method of claim 17, further comprising receiving a command indicating a position for a temperature cursor to be overlaid on an image.

19. The method of claim 18, further comprising propagating a plurality of temperature cursors on the plurality of images based on the indicated position.

20. The method of claim 16, further comprising receiving a command to associate at least one image with an alarm.

* * * * *